(12) United States Patent
Shiban

(10) Patent No.: US 8,562,930 B2
(45) Date of Patent: Oct. 22, 2013

(54) DYNAMIC OXIDATION OF PROCESS GAS

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 65 days.

(21) Appl. No.: 13/396,623

(22) Filed: Feb. 15, 2012

(65) Prior Publication Data

US 2012/0141343 A1 Jun. 7, 2012

Related U.S. Application Data

(62) Division of application No. 12/378,158, filed on Feb. 11, 2009.

(60) Provisional application No. 61/065,500, filed on Feb. 12, 2008.

(51) Int. Cl.
*B01D 53/48* (2006.01)

(52) U.S. Cl.
USPC .................... 423/244.02; 423/244.01

(58) Field of Classification Search
USPC .......... 423/220–225, 244.01, 244.02, 244.03, 423/244.06, 244.08, 244.1
See application file for complete search history.

(56) References Cited

U.S. PATENT DOCUMENTS

| | | | |
|---|---|---|---|
| 4,801,437 A | 1/1989 | Konagaya |
| 4,833,877 A | 5/1989 | Ahland |
| 5,353,829 A | 10/1994 | Shiban |
| 5,662,722 A | 9/1997 | Shiban |
| 5,699,826 A | 12/1997 | Shiban |
| 5,759,498 A | 6/1998 | Sheu |
| 5,832,843 A | 11/1998 | Park |
| 5,997,824 A | 12/1999 | Kim |
| 6,030,584 A | 2/2000 | Shiban |
| 6,030,585 A | 2/2000 | Shiban |
| 6,153,150 A | 11/2000 | Moore |
| 6,228,250 B1 | 5/2001 | Robert |
| 6,294,709 B1 | 9/2001 | Izumikawa |
| 6,315,960 B1 | 11/2001 | Shiban |
| 6,325,967 B1 | 12/2001 | Strmen |
| 6,333,010 B1 | 12/2001 | Holst |
| 6,403,048 B1 | 6/2002 | Kobayashi |
| 6,423,284 B1 | 7/2002 | Arno |
| 6,425,754 B1 | 7/2002 | Lindskog |
| 6,464,944 B1 | 10/2002 | Moore |
| 6,508,997 B2 | 1/2003 | Choate |
| 6,511,641 B2 | 1/2003 | Herman |
| 6,514,471 B1 | 2/2003 | Hsiung |
| 6,544,483 B1 | 4/2003 | Kim |
| 6,596,054 B2 | 7/2003 | Flippo |
| 6,627,162 B1 | 9/2003 | Chen |
| 6,800,255 B2 | 10/2004 | Brady |
| 7,033,550 B2 | 4/2006 | Kanno |
| 7,214,349 B2 | 5/2007 | Holst |
| 7,534,399 B2 | 5/2009 | Shiban |
| 7,736,440 B2 | 6/2010 | Ikeda |
| 2001/0001645 A1 | 5/2001 | Lee |
| 2002/0081240 A1 | 6/2002 | Kim |
| 2003/0049182 A1 | 3/2003 | Hertzler |

FOREIGN PATENT DOCUMENTS

| | | |
|---|---|---|
| FR | 2752752 | 3/1998 |
| GB | 2303803 | 7/1999 |
| JP | 7204482 | 8/1995 |
| WO | 02058824 | 8/2002 |

*Primary Examiner* — Edward Johnson
(74) *Attorney, Agent, or Firm* — James Creighton Wray

(57) ABSTRACT

Hazardous process gases are heated to auto ignition temperatures by rods and cylinders in a heating chamber. The heated gases and oxygen mix in a combustion chamber, and the gases ignite and combust. Air is introduced to cool the hot combustion products. Particles are separated from the cooled gases. Pure non hazardous gases and air are exhausted.

22 Claims, 9 Drawing Sheets

Gas flow in the heat chamber

Section A-A

Section B-B

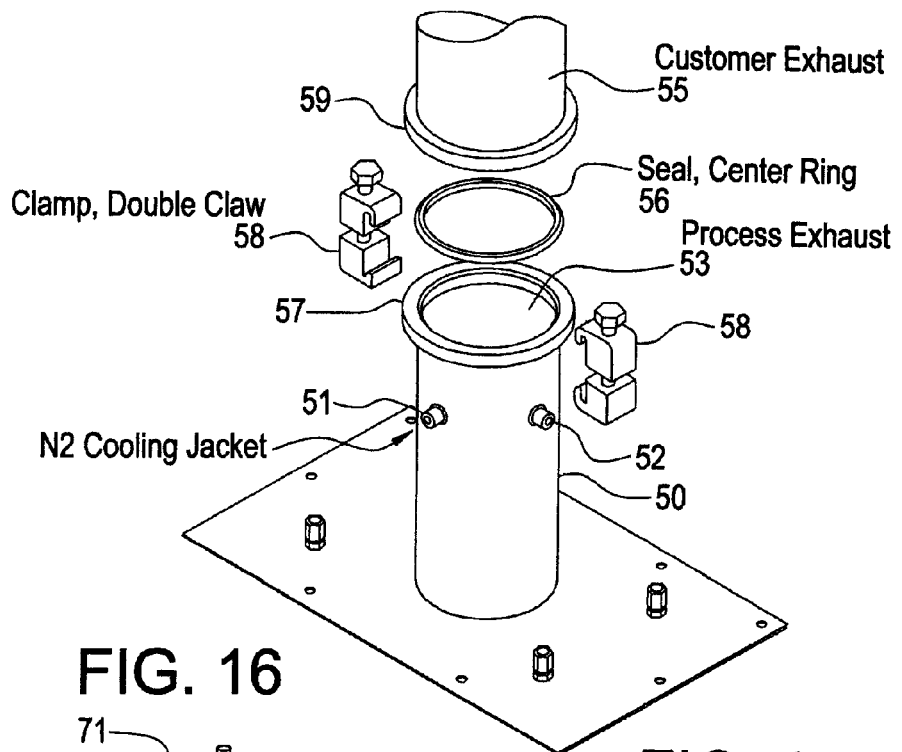
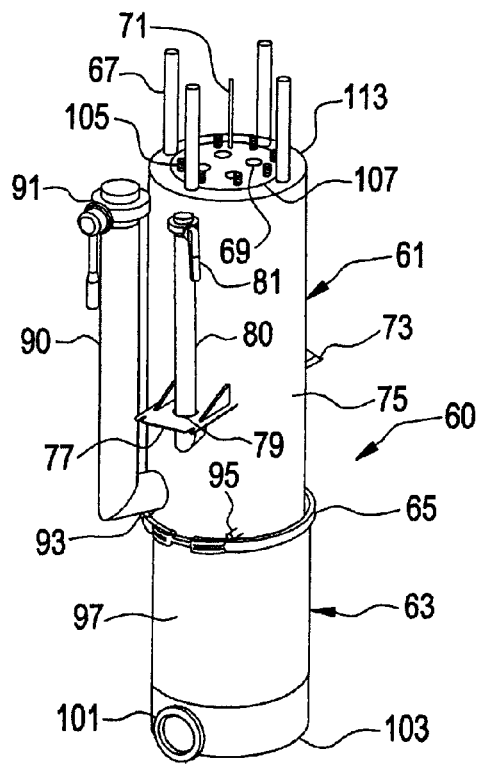
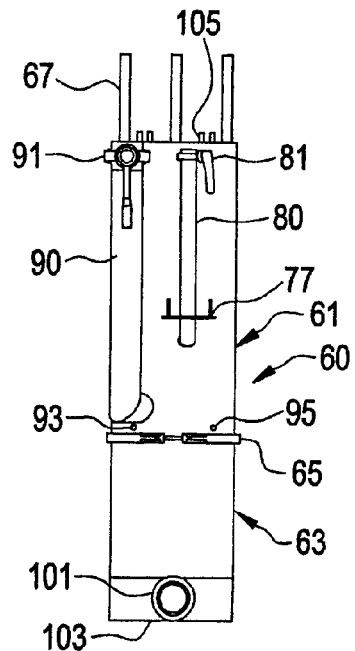

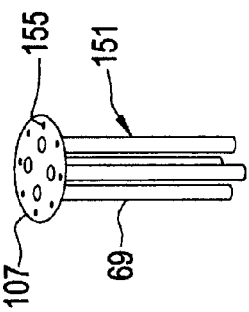
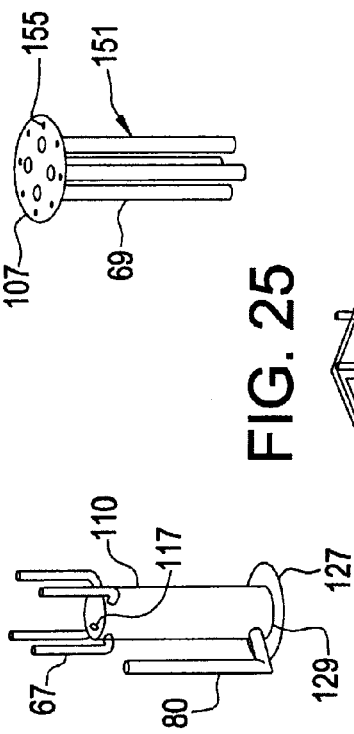
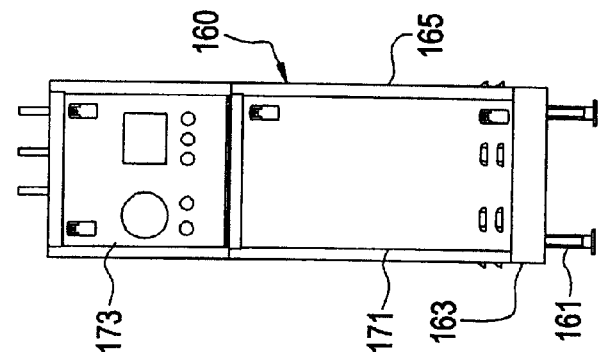
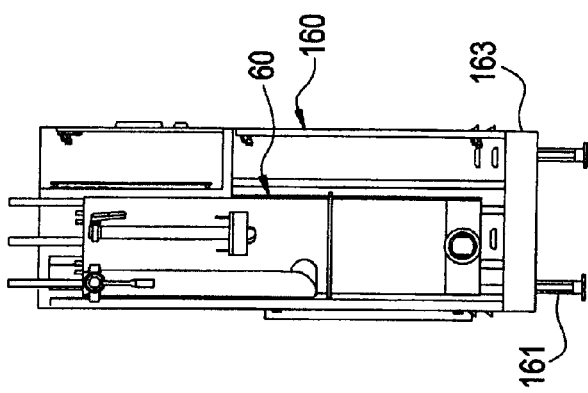
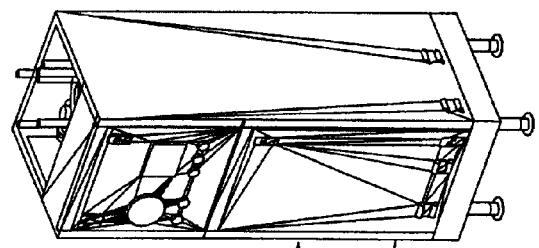

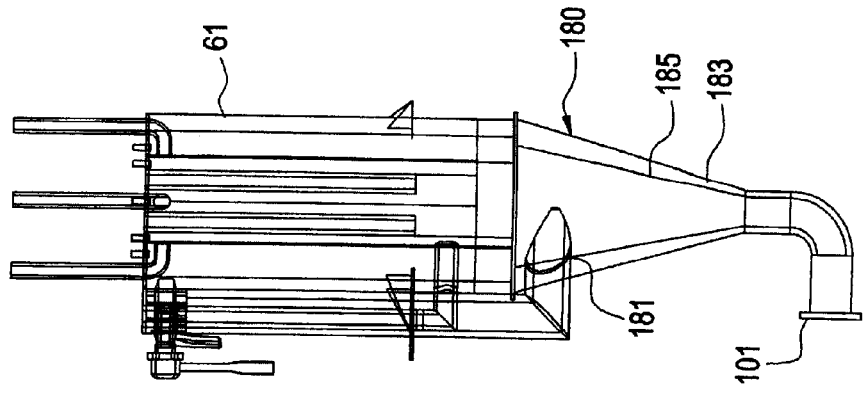
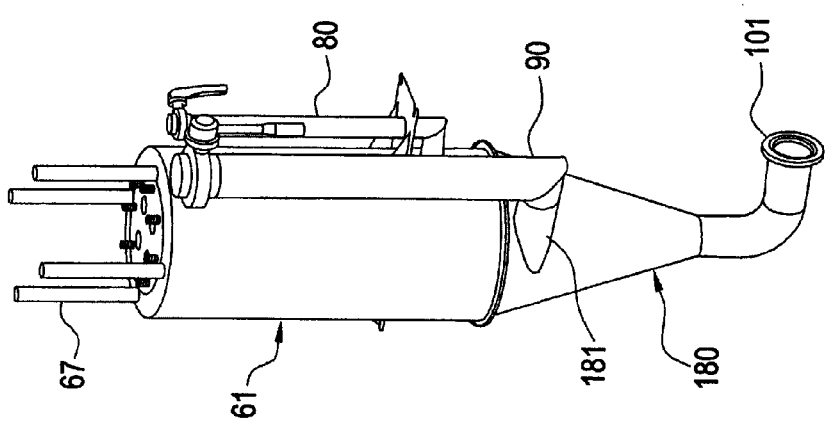
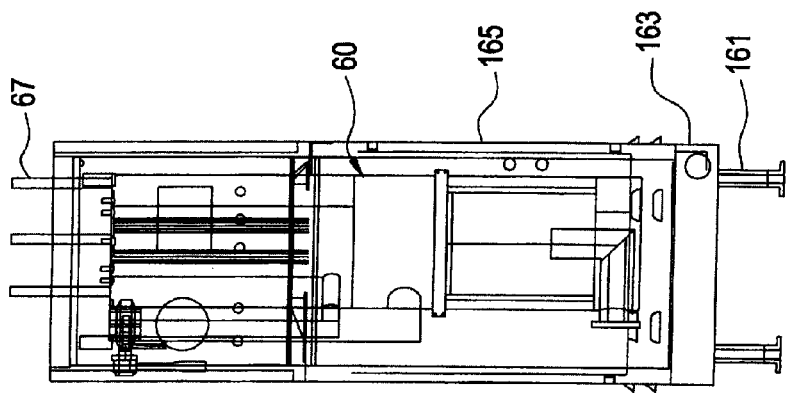

DYNAMIC OXIDATION OF PROCESS GAS

This application is a division of U.S. application Ser. No. 12/378,158 filed Feb. 11, 2009, which claims the benefit of U.S. Provisional Application No. 61/065,500, filed Feb. 12, 2008, which are hereby incorporated by reference in their entirety.

SUMMARY OF THE INVENTION

The invention provides new apparatus and methods for dynamic oxidation of combustible gases by auto ignition at elevated temperatures. The new invention brings combustible gases to elevated auto ignition temperatures and subjects them to approximately perpendicular flow of air and gas containing an oxidizer such as $O_2$. This method allows the combustible gas to spontaneously ignite and undergo dynamic oxidation in excess oxidizing gas environments for producing complete oxidation without dangers of accelerated oxidation or explosions.

The new invention includes combining and heating flammable or combustible process gases to above auto ignition temperatures (AIT), and applying dynamic oxidation to the heated gases to produce controlled burning of the gases. In this process the heated gas acts as if it were pyrophoric.

A thermal unit heats hazardous waste stream gases in a chamber to elevated temperatures of between 600° C. to 1800° C. and preferably between 900° C. to 1200° C. and up to about 2000° C. or 2000-3000° F. or more, whereupon the gases become pyrophoric. The hot gases spontaneously ignite on exposure to air or other oxidizing gases. Air is supplied laterally to the flow of the highly heated and thus pyrophoric gases. The heated gases auto ignite upon contacting the air. The rapidly expanding combustion products and the incoming air produce turbulence, complete mixing and complete combustion of the pyrophic gases. Excess air in the turbulent mix ensures spontaneous ignition and complete combustion of the hot pyrophoric gases before the reduction of temperatures to non combustible levels. The turbulence insures complete combustion of the heated waste stream gases.

Particles are removed by gravitational and mechanical separation from the heated inlet gas, the heater tubes, the resultant gaseous products and the excess air. The resultant oxidized gas, combustion products and air which have been cooled and from which particles have been separated by gravity, cyclone separators, filters or cooled scrubbers by passing cooled combustion products through cooled exhaust pipes or water sprays.

Pure non harmful gases result in the exhaust.

High temperature electrodes within hot tubes in the waste gas heating chamber rapidly heat the waste stream in an oxygen-free environment. Heating of the gas causes particles and char to adhere to the heated tubes. The tubes are periodically scraped. Scraped particles fall into a canister. The resultant products of combustion are cooled with excess of air and cooling coils. Rapid oxidation of the gas forms particles which also fall in to the canister. The particles are filtered from the resultant gaseous products and air or are removed in a cyclone separator.

The dynamic oxidation of hazardous gases includes admitting hazardous gases to a chamber, heating the gases in the chamber to auto ignition temperatures, introducing oxygen to the heated gases, auto igniting the hazardous gases with the oxygen and combusting the hazardous gases and producing non hazardous combustion gaseous products. The combustion products are cooled, and particulate matter is cleaned from the combustion products before exhausting the cooled and cleaned combustion products.

The hazardous gases are heated with rods or cylinders extending into the chamber. The rods or cylinders extend partially into the chamber. The introducing of oxygen to the heated gases occurs near or at an open end of the chamber. In one form, the introducing oxygen to the heated gases occurs in the chamber before the open end of the chamber.

The admitting hazardous gas to the chamber further comprises admitting the hazardous gas through multiple inlets near a closed end of the chamber. Combustible gases may be added to the hazardous gases in the chamber. The cooling the combustion products includes introducing cooling air following the combusting of products. The cleaning particulate matter from the combustion products is accomplished by introducing the cooling air at an angle, creating a vortex in a cyclone separator, and collecting particles flung outward from the vortex.

The combustion products and cooling air flow over a heat exchanger. The cleaning includes filtering the combustion products and cooling air through a filter before the exhausting.

The new dynamic oxidation apparatus includes an inlet for connection to a source of hazardous gases, a heating chamber connected to the inlet, heating rods or cylinders mounted in the chamber for heating the hazardous gases to auto ignition temperatures, a combustion chamber connected to the heating chamber for flowing the heated hazardous gases into the combustion chamber, and an oxygen source connected to the combustion chamber for introducing oxygen to the hazardous gases that have been heated to the auto ignition temperatures and combusting the heated gases in the combustion chamber.

A cooling chamber is connected to the combustion chamber for cooling the combusted gases. A particulate separation chamber is connected to the cooling chamber for separating particles from the combusted gases, and an exhaust is connected to the separation chamber. A heat exchanger jacket on the exhaust cools gases in the exhaust.

In one form, the cooling chamber and the particulate separation chamber are combined in a cyclone separator connected to the combustion chamber and to the exhaust for mixing air with the combustion gases and spinning the combustion gases to accelerate and fling particles centrifugally outward to a collector.

In one form the combustion chamber is continuous with the heating chamber, and the heating rods or cylinders terminate at the combustion chamber. The oxygen source is connected laterally to the combustion chamber for introducing oxygen transverse to flow of the auto igniting hazardous gas for complete mixing of the oxygen and hazardous gas.

Cooling air is flowed into the cooling chamber transverse to the combustion chamber for complete mixing with the combusted gases for diluting and cooling the combusted gases.

The separation chamber includes an outer chamber and a star-shaped filter inward from the outer chamber. The exhaust is connected to a center of the filter, the mixed air and combusted gases flow into the outer chamber, inward through the star-shaped filter and into the exhaust.

A cooled heat exchanger is positioned between the cooling chamber and the particulate separation chamber.

The oxygen source is a pressurized combustion air source. The hazardous gas inlet has plural hazardous gas inlets. The cooling chamber has a cooling air inlet.

A cabinet has openings at the top for the hazard gas inlets, the pressurized combustion air and the cooling air.

A cylindrical housing surrounds the heating chamber. The heating chamber and the combustion chamber are a continuous cylinder, having open upper and lower ends. An upper annular flange is connected to the upper end of the cylinder and to the housing and having a recess in the upper annular flange surrounds the upper end of the chamber. The hazardous gas inlet has plural inlet pipes extending through the annular flange to openings in a side of the chamber near the upper end. Bolts fixed in the recess extend upward therefrom. The heating rods or cylinders have upper ends connected to a plate for fitting in the recess and closing the upper end of the continuous cylinder. The plate has holes for receiving the bolts and securing the plate in the recess. The heating rods or cylinders terminate downward above the open lower end of the cylinder. The combustion chamber is positioned between the lower open end and the lower ends of the heating rods or cylinders. A lower annular flange extends outward from the open lower end of the cylinder to the cylindrical housing for supporting the continuous cylinder in the housing. The lower annular flange forms an upper surface of the cooling chamber. The cooling air inlet is connected to the cylindrical housing below the lower annular flange. The pressurized combustion air source includes a valved pipe extending downward in the cabinet external to the cylindrical housing and extending radially inward through the cylindrical housing to a radial combustion air opening in the combustion chamber.

The dynamic oxidation apparatus and the cylindrical housing have an upper part and a lower part connected by a quick disconnect clamp. The continuous cylinder and the cooling chamber are in the upper part, and the particulate separation chamber is in the lower part. The separation chamber includes an outer annular plenum receiving the mixed cooling air and combustion products from the cooling chamber. A complex-shaped filter is positioned inward from the annular plenum. Upper and lower bypass prevention plates are mounted above and below the filter. The exhaust is connected to a center of the filter.

The disclosure of co-pending patent application Ser. No. 10/796,120 filed Mar. 10, 2004 is incorporated in its entirety herein, as if fully set forth herein.

These and further and other objects and features of the invention are apparent in the disclosure, which includes the above and ongoing written specification, with the drawings.

BRIEF DESCRIPTION OF THE DRAWINGS

FIG. 15 is a perspective exploded view of an exhaust cooling jacket.

FIG. 16 is a perspective view of a dynamic oxidation system.

FIG. 17 is a side elevation of the dynamic oxidation system shown in FIG. 16.

FIG. 23 is a perspective view of the heating chamber.

FIG. 24 is a perspective view of the heating rods assembly for positioning in the heating chamber.

FIG. 25 is a perspective view of the cabinet in which the dynamic oxidation system shown in FIGS. 16-24 is mounted.

FIG. 26 is a side elevation of the dynamic oxidation system shown in FIGS. 16-24 mounted in the cabinet of FIG. 25, with a side panel removed.

FIG. 27 is a front elevation of the cabinet.

FIG. 28 is a front elevation of the cabinet with the front panels removed to show the dynamic oxidation system and with the control panel shown in relative position.

FIG. 29 is a perspective view of the dynamic oxidation system with a cyclone separator replacing the cooler and filter separator.

FIG. 30 is a cross sectional elevation of the dynamic oxidation system shown in FIG. 29.

DETAILED DESCRIPTION OF THE PREFERRED EMBODIMENTS

Figure 1:
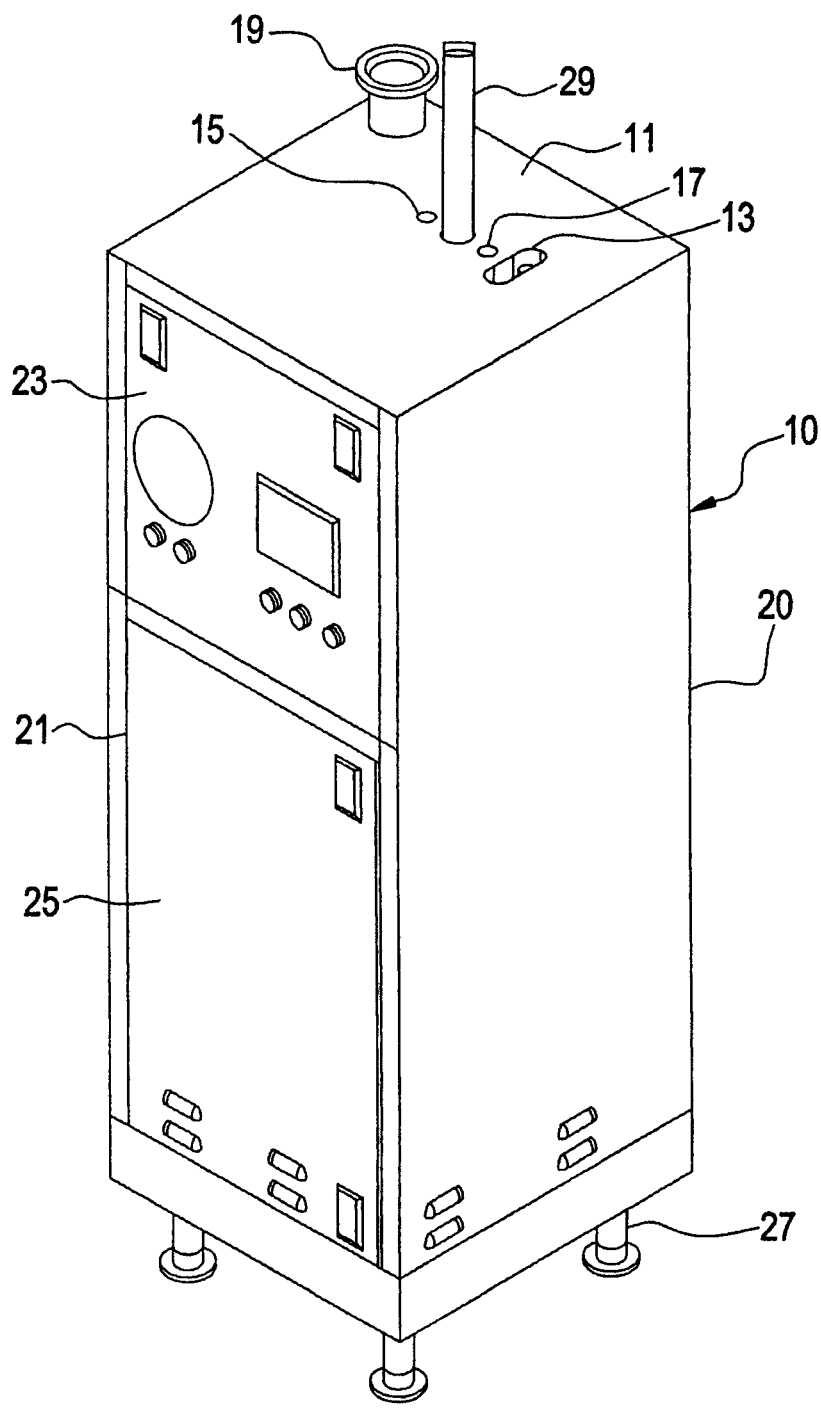
FIG. 1 is a perspective external view of an apparatus for heat treating and auto igniting gaseous waste streams.

A dynamic oxidation system 10 is shown in FIG. 1. Top 11 has a process gas inlet connection access 13, an oxidized gas exhaust 19, and nitrogen connection accesses 15, 17 for connecting to a drive cylinder 29 for a scraper.

Front 21 of cabinet 20 has a control panel 23 and an access door 25. Leveling legs 27 stabilize the cabinet.

The scraper operating cylinder 29 extends from top 11. Cylinder 29 may be double-acting and driven alternately in opposite directions, or may be single-acting, driven in a downward direction and being returned by a gas or mechanical spring.

Figure 2:
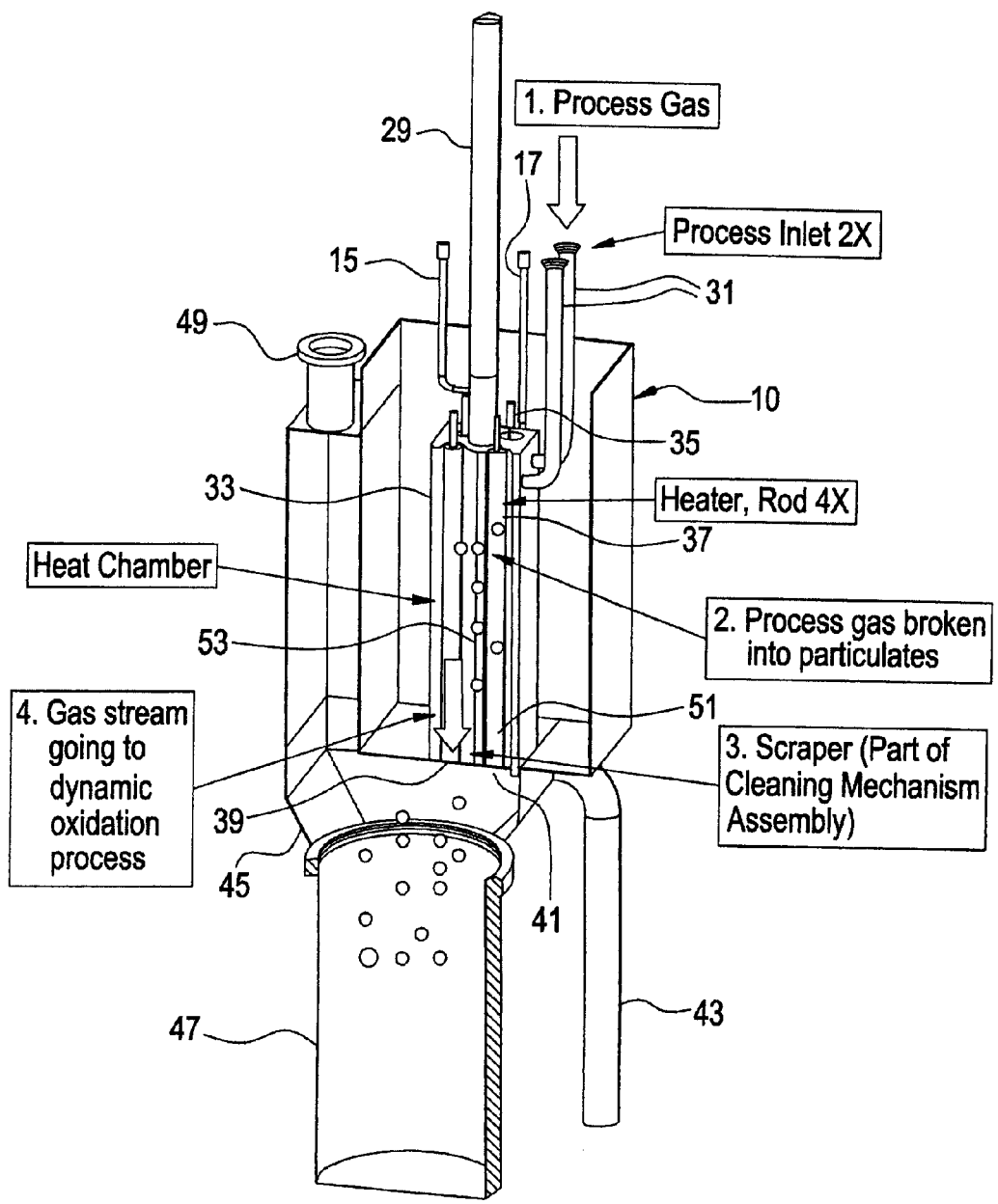
FIG. 2 is a schematic representation of the apparatus, showing gas flow through the heating chamber.

FIG. 2 shows the dynamic oxidation system 10. Process gas 1 enters either or both of two inlets 31 and flows through a chamber 33, where four, eight or more hot ceramic cylinders 37 heat the combustible process gas to auto ignition temperatures. Electrical heater rods 35 internally heat the hot cylinders 37. The heated gas 4 exits the open bottom outlet 39 of chamber 33 and auto ignites in the air 41 flowing from air inlet 43 across the open bottom outlet 39 of heater chamber 33. The transverse flow of air and gases, the auto ignition and the rapid combustion and expansion of the gases create turbulence in chamber 45. The process gas auto ignites in the turbulent excess air and fully combusts and oxidizes as it mixes with the excess air in chamber 45. Suspended particles and free liquids drop into lower canister 47. The excess air cools and mixes with the oxidized exhaust gas, which is released through exhaust 49.

The heated process gas forms particulates 2 in the heater chamber 33. Some of the particulates stick to the cylindrical outer walls of the hot heater cylinders 37. Other particles flow with the gas and are released from the slowed and cooled turbulent oxidized gas in the chamber 45 and fall into canister 47.

Figure 3:
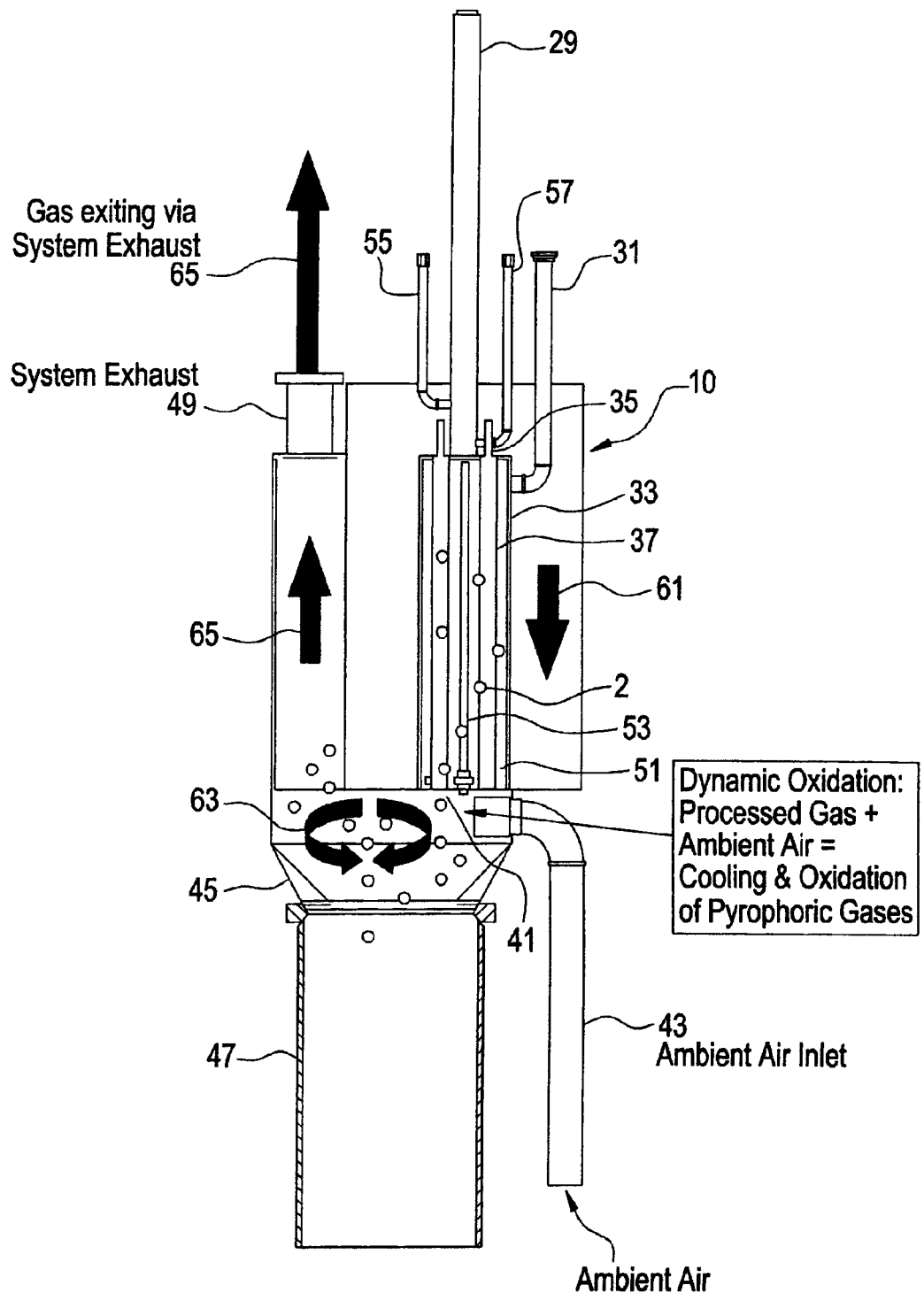
FIG. 3 is a schematic representation of the apparatus showing gas flow through the heating chamber, followed by turbulent dynamic oxidation and exhaust.

Scraper 3 has a scraper plate 51 with openings sized to scrape outer walls of the heated cylinders 37. Scraper plate 51 is moved along those cylinder walls by a piston rod 53 driven by cylinder 29. FIG. 3 shows nitrogen tubes 55, 57 which are connected to cylinder 29. Pressurized nitrogen drives the piston, piston rod 53 and scraper 51 to scrape particles 2 from the walls of heated cylinders 37.

The gas flows are indicated by arrows 61, 63 and 65. Arrow 61 represents hazardous gas flow through heating chamber 33. Arrows 63 represent auto ignition of the heated processed gas and turbulent mixing and cooling of the oxidized gas with excess air before the exhaust flow, indicated by arrows 65.

Figure 4:
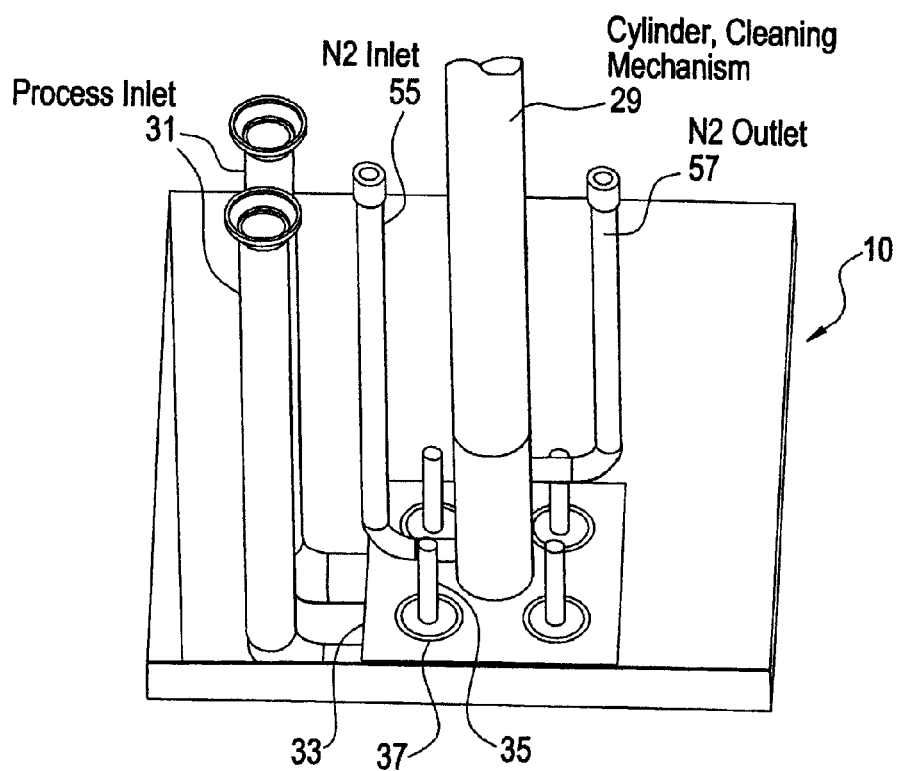
FIG. 4 is a perspective view of a treatment head showing process gas inlets, cylinder heaters for the heating chamber, and a double-acting cylinder and driven by nitrogen from nitrogen inlets and outlets, for the scrapping of the heating cylinders.
Figure 5:
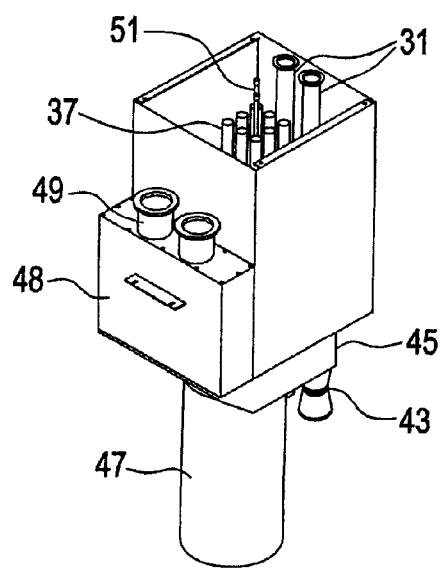
FIG. 5 is a perspective view of the treatment apparatus.

FIG. 4 shows the top of the dynamic oxidation system 10. Cylinder 29 drives cleaning scraper 51 to clean the hot cylinder walls. Nitrogen operating connection tubes 55, 57, tops of electric heating rods 35, and tops of heated cylinders 37 are shown on top of the process gas heating chamber 33. One or both of the process gas inlet tubes 31 may be used to conduct process gas to the heater chamber 33 from one or more sources.

FIGS. 5-14 show the process gas inlets 31, heating rods 35 and sealed heating cylinders 37, heating chamber 33, air inlet 43, turbulent mixing and auto ignition chamber 45, particle receiver canister 47, exhaust plenum 48 and exhaust pipes 49.

Figure 6:
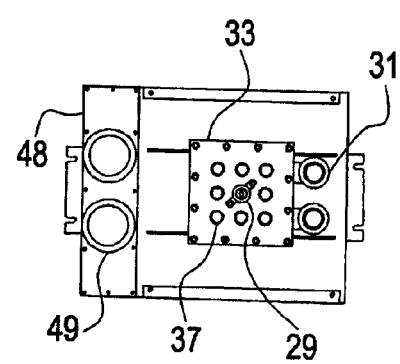
FIG. 6 is a top view of the treatment apparatus.
Figure 7:
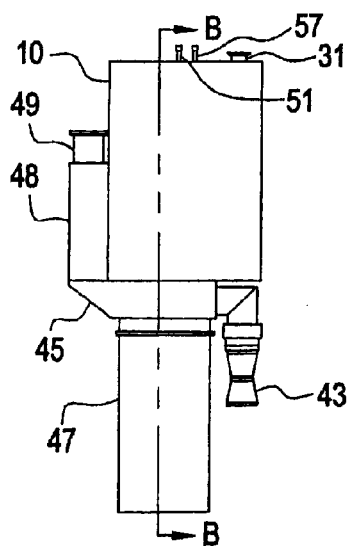
FIG. 7 is a side elevation of the treatment apparatus.
Figure 8:
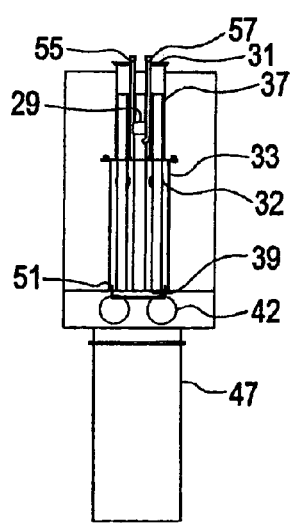
FIG. 8 is a vertical cross-section of the treatment apparatus taken along line B-B of FIG. 7.

FIGS. 6 and 8 show hazardous gas inlets 31 to heating chamber 33 and air inlets 42, which provide the transverse air flow across the open bottom outlet 39 of heating chamber 33.

Figure 9:
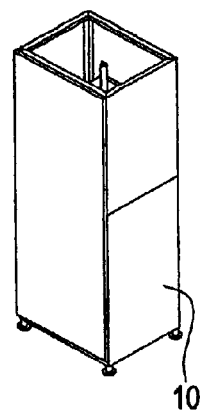
FIG. 9 is a perspective view of the treatment cabinet holding the apparatus of FIGS. 5-8.

FIG. 9 shows the cabinet 20 which holds treatment system 10.

Figure 10:
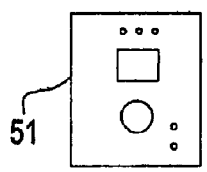
FIG. 10 is a schematic representation of a remote control.
Figure 11:
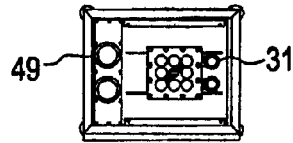
FIG. 11 is a top view of the cabinet holding the apparatus.
Figure 12:
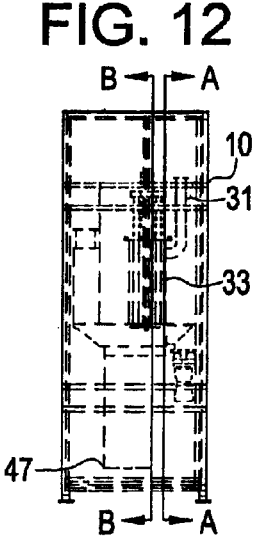
FIG. 12 is an elevation of the cabinet with the treatment apparatus shown in hidden lines.
Figure 13:
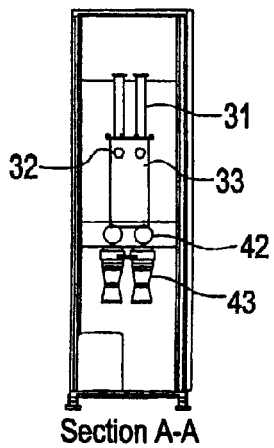
FIG. 13 is an elevational cross-section taken along line A-A of FIG. 12.
Figure 14:
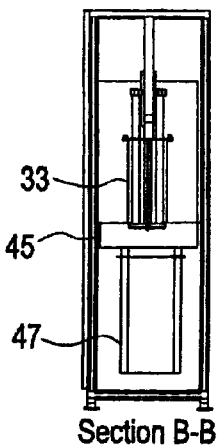
FIG. 14 is an elevational cross-section taken along line B-B of FIG. 12.

FIG. 10 shows the remote control panel 51 which may control the onboard control panel 23 shown in FIG. 1.

A cooling jacket shown in FIG. 15 may be connected to each process gas exhaust 49 from the dynamic oxidation auto igniting system 10. As shown, the cooler jacket 50 is connected to the process exhaust 49 from the dynamic oxidizer.

Cooling jacket 50 is supplied with a nitrogen inlet 51 and outlets 52 to cool the interior 53 through which the exhaust gas flows.

The cooling jacket 50 of the gas exhaust 49 is connected to a customer location exhaust 55 with flanges 57, 59, sealing ring 56, and clamps 58.

Figure 18:
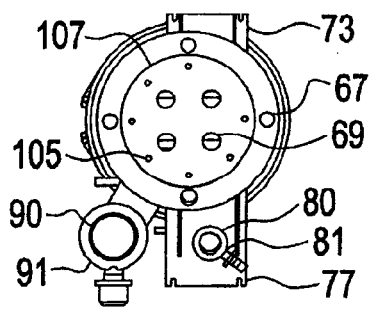
FIG. 18 is a top plan view of the dynamic oxidation system shown in FIGS. 16 and 17.
Figure 20:
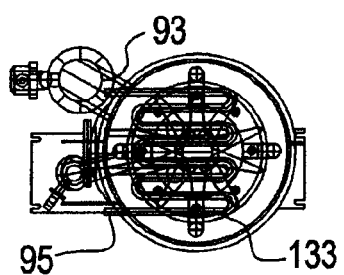
FIG. 20 is a cross sectional top view of the dynamic oxidation system as shown in FIGS. 16-19.

FIGS. 16-18 show a cross sectional perspective view of the dynamic oxidation system 60 which has an upper part 61 and a lower part 63 joined by a clamp 65.

Upper part 61 has four hazardous gas inlets 67 and four heater rods 69. Plunger 71 is connected to a circular plate with holes which is moved down and up to scrape outer surfaces of the heater rods 69 and the inner surface of a cylindrical chamber through which the heater rods extend. The heater rods 65 heat hazardous gas introduced in the top of the chamber through inlets 67 to auto ignition temperatures by the time the gas reaches a lower end of the chamber. Mounting platforms 73, 77 extend from outer wall 75 of the upper part 61. A larger one 77 of the platforms has a central opening 79 through which a combustion air inlet tube 80 is mounted. Valve 81 controls flow of combustion air through tube 80. The combustion air is flowed into the bottom of the chamber below the heater rods. The hot gases heated by the rods in the chamber to auto ignition temperatures combust upon contact with the air. The resulting turbulence thoroughly mixes the air with the heated gases to completely combust the gases.

A cooling air inlet tube 90 of larger diameter is controlled by a valve 91. The cooling air mixes with the combustion products in a large volume below the lower open end of the auto combustion chamber, immediately cooling the gaseous combustion products. A water inlet 93 and outlet 95 are connected to a serpentine heat exchanger at the bottom of the large cooling volume. The mixture of combustion products and excess combustion air and cooling air are further cooled by flowing over the heat exchanger. The cooled gases flow into and through an outer chamber within wall 97 of the lower part 63.

From the outer chamber the cooled gaseous products and air mixture flows through walls of a star shaped filter into a central are of the filter. The filter has plates at its top and base. An exhaust 101 leads the cleaned gases out of the system. Solid particles are collected on the outer wall of the filter and are removed from the outer wall by disconnecting clamp 65 and back flushing the filter with air through exhaust outlet 101 or by removing and replacing the filter.

Particles fall from the filter through a screen and into a collector at the bottom 103 of the lower part 63.

Bolts 105 and locking nuts connect the top plate 107 to the top of the upper part 61. Top plate 107 forms the top of the heating chamber.

Figure 19:
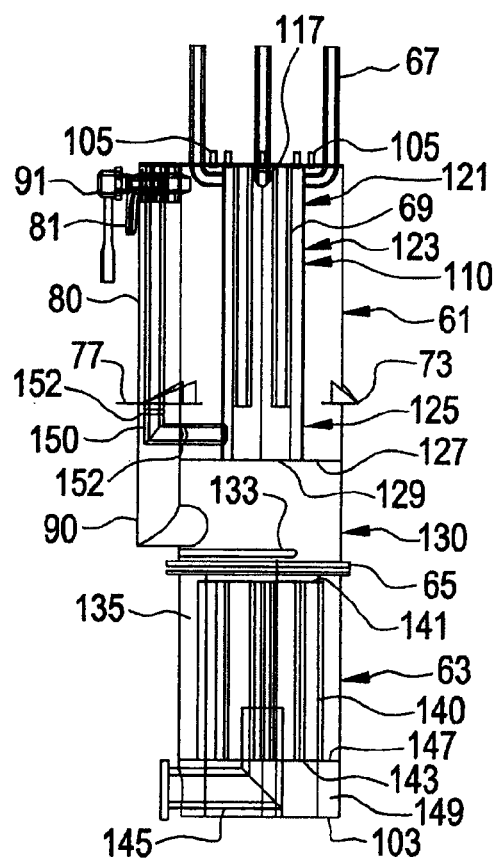
FIG. 19 is a cross sectional side elevation of the dynamic oxidation system as shown in FIGS. 16-18.
Figure 22:
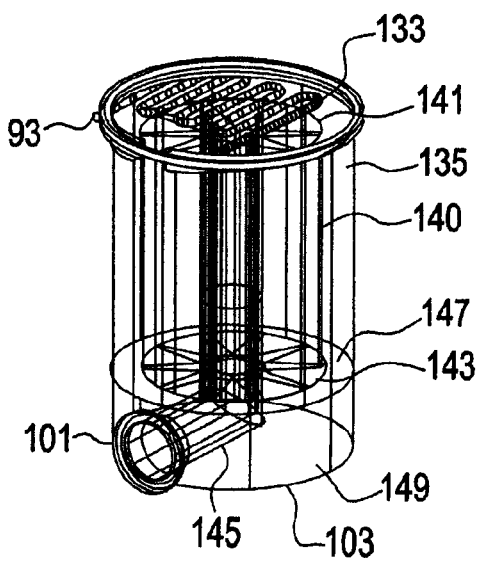
FIG. 22 is a cross sectional perspective view of the lower part of the dynamic oxidation system as shown in FIGS. 16-20.

FIG. 19 is a cross sectional side elevation of the dynamic oxidation system showing the heating chamber 110. Bolts 105 extend upward from a recess 111 in a flange 113 around the open top of the chamber 110. The hazardous gas inlets 67 extend through openings 115 in flange 113 into side openings 117 in the open ended heating chamber.

Figure 21:
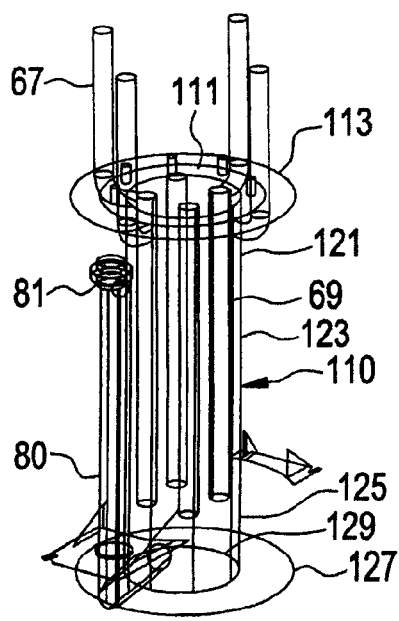
FIG. 21 is a cross sectional perspective view of the upper part of the dynamic oxidation system as shown in FIGS. 16-20.

Top plate 107 of the heater tube assembly is bolted in place in the recess 111 (FIG. 21) in flange 113 around the open top of the heating chamber 110. Top plate 107 holds the heating rods 69 positioned in chamber 110.

Hazardous gas from inlets 67 enters the upper part 121 of the heating chamber 110. Heating rods 69 heat the hazardous gas to auto ignition temperatures in the upper and middle parts 121 and 123 of chamber 110. Combustion air from the combustion air inlet filter 80 enters the lower combustion chamber part 125 of chamber 110. Rapid mixing of the combustion air and auto ignition and combustion of the hot hazardous gases occurs in combustion chamber part 125. Bottom ring 127 is connected around the open lower end 129 of chamber 110 to maintain the chamber centered in the upper part 61 of the system 60. Bottom ring 127 also forms the top of the cooling chamber 130. Combustion products and excess combustion air from combustion chamber 125 flow into the cooling chamber 130 where they are mixed with air from cooling air inlet 90. The air and cooled gases move over and around the cooling water serpentine heat exchanger 133, which is connected to cooling water inlet 93 and outlet 95.

Then the cooled gases move outward and downward to the annular chamber 135 around the star-shaped particle filter 140. A top plate 141 and bottom plate 143 prevent bypass around the filter 140. Air and combustion product gases flow inward through the filter, and then outward through a 90° exhaust pipe 145 and exhaust opening 101.

Annular screen 147 around bottom plate 143 allows large particles to collect in collector 149.

As shown in FIG. 19, the combustion air inlet 80 is a rigid pipe with a threaded 90° elbow 150 and seals 152. A filter is inserted in the combustion air inlet to ensure combustion air is free of particles or dust which interfere with combustion or might impact walls of combustion chamber 125 during the rapid auto ignition combustion of the hot hazardous gases.

FIG. 23 shows the open ended heating and combustion chamber 110 with the hazardous gas inlets 67, and combustion air inlet 80. Lower ring 127 connected around the open lower open end 129 is used to mount the heating and combustion chamber 110 in the upper part 61 of the system 60. Opening 117 is shown where process gas enters the side of the upper part 121 of chamber 110.

FIG. 24 shows a heater rod assembly 151 with a top plate 107 which fits in a recess 111 in the top 113 of the upper part 61. Bolts 105 extend through openings 155 in top plate 107 to hold the heater rod assembly 151 in place.

FIGS. 25 through 28 show a cabinet 160 which holds the system 60. Cabinet 160 has adjustable support legs 161 and a base 163 which holds a frame 165 for the wall panels.

Front panels 171, 173 shown in FIG. 27 are drawn transparent as shown in FIG. 28 to show the system 60. Side panel 175 has been removed to show the system 60 in FIG. 26.

FIGS. 29 and 30 show a cyclone separator 180 connected to the upper part 61 of the system 60. The cyclone separator 180 spins and cools the hot combustion products. The angular air inlet 181 spins the combustion product gases and air to fling and remove particles outward by centrifugal force. The particles drop into collectors 183 outside the screen 185. The cool, pure exhaust gases flow out of the exit 101.

A primary purpose of the invention is the treatment of hazardous process gases such as produced from electronic component manufacturing or other manufacturing processes to produce fully oxidized clean gases that can be released safely to the atmosphere.

The process begins by preheating combustible non pyrophoric gases to highly elevated temperatures of up to about 2,000 to 3,000° F. or 2,000° C. or more to a level where they auto ignite and oxidize upon contact with oxygen such as, for example, oxygen in the air. The process is accomplished using excess oxygen and air to ensure auto ignition and complete controlled combustion and oxidation of the otherwise hazardous gases without dangers of explosion.

While the invention has been described with reference to specific embodiments, modifications and variations of the invention may be constructed without departing from the scope of the invention.

I claim:

1. Dynamic oxidation of hazardous gases comprising:
admitting hazardous gases to a chamber,
heating the gases in the chamber to auto ignition temperatures,
introducing oxygen to the heated gases and auto igniting the hazardous gases with the oxygen,
combusting the hazardous gases and producing non hazardous combustion gaseous products,
cooling the combustion products,
cleaning particulate matter from the combustion products, and
exhausting the cooled and cleaned combustion products.

2. The dynamic oxidation of claim 1, wherein the heating comprises heating the hazardous gases with rods or cylinders extending into the chamber.

3. The dynamic oxidation of claim 2, wherein the rods or cylinders extend partially into the chamber.

4. The dynamic oxidation of claim 1, wherein the introducing oxygen to the heated gases occurs near or at an open end of the chamber.

5. The dynamic oxidation of claim 1, wherein the introducing oxygen to the heated gases occurs in the chamber before an open end of the chamber.

6. The dynamic oxidation of claim 1, wherein the admitting hazardous gas to the chamber further comprises admitting the hazardous gas through multiple inlets near a closed end of the chamber.

7. The dynamic oxidation of claim 1, further comprising adding combustible gases to the chamber.

8. The dynamic oxidation of claim 1, wherein the cooling the combustion products comprises introducing cooling air following the combusting of the hazardous gases.

9. The dynamic oxidation of claim 8, wherein the cleaning particulate matter from the combustion products comprises introducing the cooling air at an angle and creating a vortex in a cyclone separator and collecting particles flung outward from the vortex.

10. The dynamic oxidation of claim 8, further comprising flowing the combustion products and cooling air over a heat exchanger.

11. The dynamic oxidation of claim 8, wherein the cleaning further comprises filtering the combustion products and cooling air through a filter before the exhausting.

12. A dynamic oxidation process comprising:
dynamically oxidizing hazardous gases further comprising,
providing an inlet for connection to a source of hazardous gases,
providing a heating chamber connected to the inlet,
providing heating rods or cylinders in the chamber for heating the hazardous gases to auto ignition temperatures,
providing a combustion chamber connected to the heating chamber,
flowing the heated hazardous gases from the heating chamber into the combustion chamber,
providing an oxygen source connected to the combustion chamber,
introducing oxygen in the combustion chamber to the hazardous gases that have been heated to the auto ignition temperatures,
combusting the heated gases with the oxygen in the combustion chamber,
providing a cooling chamber connected to the combustion chamber,
cooling the combusted gases in the cooling chamber,
providing a particulate separation chamber connected to the cooling chamber,
separating particles from the combusted gases in the separation chamber,
providing an exhaust connected to the separation chamber, and
exhausting the separated gas from the separation chamber.

13. The process of claim 12, further comprising:
providing a heat exchanger jacket on the exhaust, and
cooling gases in the exhaust before releasing gases from the exhaust.

14. The process of claim 12, further comprising:
providing a cyclone separator connected to the combustion chamber and the exhaust,
combining the cooling chamber and the particulate separation chamber in the cyclone separator,
mixing air with the combustion gases and spinning the combustion gases and air, and
accelerating and flinging particles centrifugally outward from the cyclone separator to a collector.

15. The dynamic oxidation process of claim 12, providing the combustion chamber continuous with the heating chamber and terminating the heating rods or cylinders at the combustion chamber, connecting the oxygen source laterally to the combustion chamber and introducing oxygen transversely, heating hazardous gas, and auto igniting hazardous gas and completely mixing the oxygen and hazardous gas.

16. The dynamic process apparatus of claim 12, further comprising flowing the air into the cooling chamber transversely to the combustion chamber for completely mixing the air with the combusted gases, and diluting and cooling the combusted gases with the air.

17. The dynamic oxidation process of claim 12, further comprising providing a separation chamber providing an outer chamber and providing a star-shaped filter inward from the outer chamber, and connecting an exhaust to a center of the filter, mixing air with the combusted gas, and flowing the mixed air and combusted gases into the outer chamber, and from the outer chamber inward through the star-shaped filter and into the exhaust.

18. The dynamic oxidation process of claim 12, further comprising providing a cooled heat exchanger between the cooling chamber and the particulate separation chamber, and further cooling the gas with the heat exchanger before the separation chamber.

19. The dynamic oxidation process of claim 12, wherein the providing the oxygen source further comprises providing a pressurized combustion air source and wherein the providing the inlet comprises providing plural hazardous gas inlets and further comprising providing a cooling air inlet in the cooling chamber.

20. The dynamic oxidation process of claim 19, further comprising providing a cabinet having openings at its top for the hazard gas inlets, the pressurized combustion air and the cooling air.

21. The dynamic oxidation process of claim 20, further comprising providing a cylindrical housing, and wherein providing the heating chamber and providing the combustion chamber further comprise providing a continuous cylinder, having open upper and lower ends having an upper annular flange connected to the upper end of the cylinder and to the housing and having a recess in the upper annular flange around the open upper end of the chamber, wherein the providing the inlet for the hazardous gas comprises providing plural inlet pipes extending through the annular flange to openings in a side of the chamber near the upper end, bolts fixed in the recess and extending upward therefrom, wherein the heating rods or cylinders have upper ends connected to a plate for fitting in the recess and closing the upper end of the continuous cylinder, wherein the plate has holes for receiving the bolts, and securing the plate in the recess, wherein the heating rods or cylinders terminate downward above the open lower end of the cylinder, providing the combustion chamber between the lower open end and the lower ends of the heating rods or cylinders, a lower annular flange extending outward from the open lower end of the cylinder to the cylindrical housing for supporting the continuous cylinder in the housing and forming an upper surface of the cooling chamber, wherein the cooling air inlet is connected to the cylindrical housing below the lower annular flange, and the pressurized combustion air source comprises a valved pipe extending downward in the cabinet external to the cylindrical housing and radially inward through the cylindrical housing to a radial combustion air opening in the combustion chamber.

22. The dynamic oxidation process of claim 21, wherein the providing the cylindrical housing comprises providing an upper part and a lower part connected by a quick disconnect clamp, wherein the continuous cylinder and the cooling chamber are in the upper part, and the particulate separation chamber is in the lower part, the separation chamber further comprising an outer annular plenum receiving cooling air and combustion products from the cooling chamber, a complex-shaped filter inward from the annular plenum, upper and lower bypass prevention plates mounted above and below the filter, and wherein the exhaust is connected to a center of the filter.

* * * * *